United States Patent [19]

Hertkorn

[11] 4,127,956
[45] Dec. 5, 1978

[54] TARGET CASTING APPARATUS

[75] Inventor: Douglas J. Hertkorn, Key Largo, Fla.

[73] Assignee: Robert J. McNair, Jr., Cincinnati, Ohio

[21] Appl. No.: 827,552

[22] Filed: Aug. 25, 1977

[51] Int. Cl.² ............................................. A01K 91/02
[52] U.S. Cl. .................................................... 43/19
[58] Field of Search ................. 43/19; 124/16, 17, 21

[56] References Cited

U.S. PATENT DOCUMENTS

| 1,376,260 | 4/1921 | Davis ........................................ 43/19 |
| 3,129,525 | 4/1964 | Lewis ........................................ 43/19 |
| 4,040,198 | 8/1977 | Skibo ........................................ 43/19 |

*Primary Examiner*—Robert C. Watson
*Attorney, Agent, or Firm*—Robert J. McNair, Jr.

[57] ABSTRACT

A target fishing apparatus is disclosed which when attached to a conventional rod and reel assembly allows casting of a baited hook to a desired location. The unit may be used in areas where restricted overhead clearance precludes conventional casting. Actuation of a trigger mechanism causes an elastic member to propel a lure and attached line from a bait cup toward the target area.

9 Claims, 7 Drawing Figures

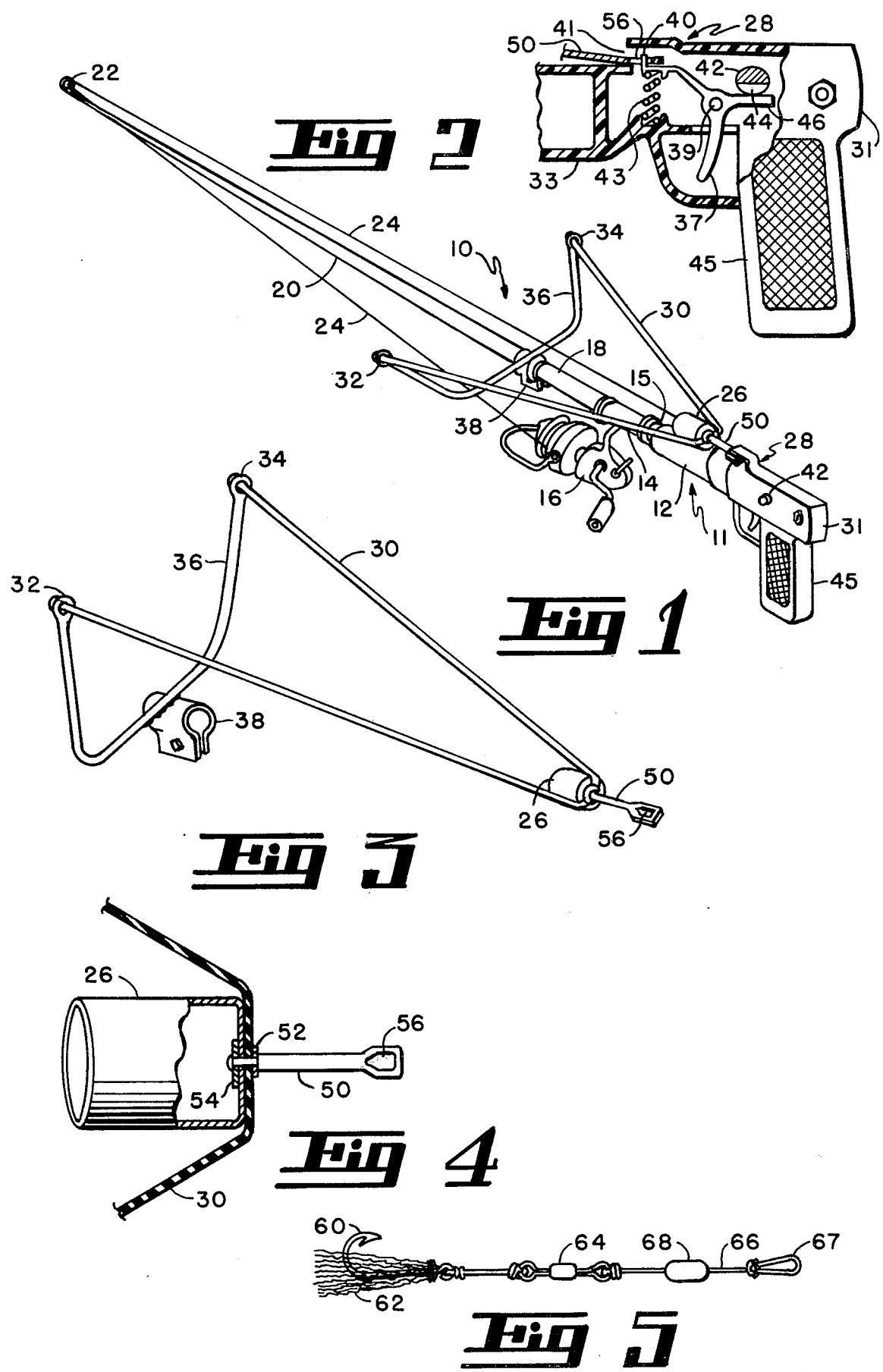

TARGET CASTING APPARATUS

BACKGROUND OF THE INVENTION

The present invention relates to fishing apparatus having propellant means for casting a baited hook toward a desired target area. The apparatus is best used in conjunction with either a spinning reel or a spin casting reel.

The existing art for propelling a baited hook and attached line into a general target area includes the following U.S. Patent Nos.:

3,962,813 to Moon
3,015,182 to Tuttle et al
2,225,719 to Shotton
2,217,820 to Rowe The target fishing rod of Moon propels a float subassembly with hook attached from the bore of a small cylinder by release of a compressed spring.

The power casting device of Tuttle et al uses a gas-propellant gun to propel a projectile with baited hook attached. In general the Tuttle et al invention is intended to be used for casting a baited hook over distances beyond the capabilities of a fisherman.

The bait casting device of Shotton makes use of an air pistol to launch a specially configured lure with integral hook. The lure is generally in the shape of a small football which fits snugly into the bore of the air pistol. A reel of fishing line is carried in the butt stock with the free end of the line going down the center of the barrel for attachment to the lure.

The fishing apparatus of Rowe comprises a series of spring loaded telescoping sections topped off by a bait container. On being triggered the several sections simultaneously snap out into their extended position with the fisherman hanging onto the base section. This action launches the lure with line attached from the bait container.

None of these references disclose the features of my invention. None of them have the mechanical simplicity of my fishing apparatus and this is particularly important when used in the corrosive environment of the sea. Further, my invention can be implemented for use either with a conventional rod and reel or as an integral assembly arranged for attachment of a conventional spinning reel. With my invention, the fisherman uses the same baits and lures which he would use to take fish when using conventional tackle.

SUMMARY OF INVENTION

The fishing apparatus of this invention comprises a hand grip, a reel seat, a flexible rod section, line guiding means, a reel which when released freely pays out line, a generally U-shaped yoke attached at its midpoint to the rod at a location ahead of the reel seat and arranged so as to be perpendicular to the rod with the arms of the yoke pointing outward from the rod and away from the reel, an elastic member having its ends attached to the outward pointing tips of the yoke arms, the midpoint of the elastic member having attached thereto a bait cup, there being a short slender bar extending rearwardly from the bait cup, the bar having an opening therethrough near the end farthest away from the bait cup, and a triggering mechanism capping off the heel of the hand grip. The triggering mechanism does two things. First, it has a catch which engages the opening in the slender bar at the rear of the bait cup. Inserting the bar in the catch requires stretching of the elastic member to an extended position. Secondly, the triggering mechanism allows the fisherman to trip the catch holding the elastic member in its extended position.

The fisherman will trip the catch only after he has released the drag on the reel, placed the lure and hook with line attached into the bait cup, and then aimed the tip of the rod in the direction of the target area where he wishes to fish. Tripping of the catch causes the elastic member to propel the baited hook along a trajectory which is dependent on the weight of the lure and the energy stored in the elastic member.

BRIEF DESCRIPTION OF THE DRAWINGS

FIG. 1 is a perspective view of the fishing rod assembly showing the elastic member in its extended position.

FIG. 2 is a partially cutaway view of the triggering mechanism shown in FIG. 1.

FIG. 3 is a perspective view of the U-shaped yoke with elastic member and bait cup attached.

FIG. 4 is a cross sectional view of the bait cup.

FIG. 5 is a typical lure used with spinning reel type tackle.

DESCRIPTION OF PREFERRED EMBODIMENT

Figure 6:
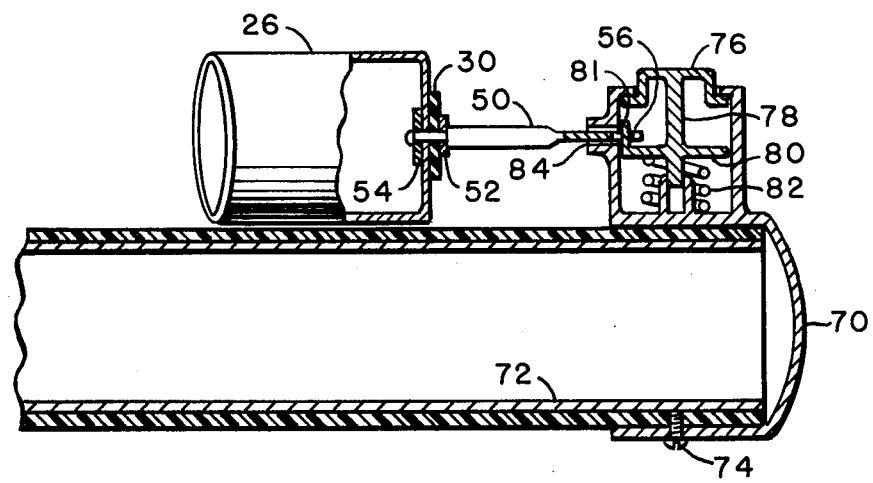
FIG. 6 is a cross sectional view of an alternate triggering mechanism.

FIG. 1 shows a perspective view of target fishing apparatus 10 which embodies my invention. Apparatus 10 includes hand grip section 11 having a cork grip 12, a reel seat 14, a spinning reel 16 and a fore-grip 18. The reel seat 14 includes a threaded sleeve 15 which allows proper attachment of reel 16 to the hand grip section 11. Above the hand grip section and integrally attached thereto is flexible rod section 20. At the tip of rod 20 is line guide 22. Line 24 comes from a supply spool on reel 16, passes through guide 22 and continues back to a lure which rests in bait cup 26.

Bait cup 26 is shown locked into place in triggering mechanism 28. This action will be more fully explained later. In any case, with bait cup 26 locked into place in triggering mechanism 28, elastic member 30 will be stretched taut. Ends 32 and 34 of elastic member 30 are fastened to the outward pointing ends of U-shaped yoke 36. The center of yoke 36 is attached by means of clamp 38 to the front-end of fore-grip 18. The center of elastic member 30 passes around the rear of bait cup 26.

Release of the catch in triggering mechanism 28 allows elastic member 30 to propel the contents of bait cup 26 forward off the tip of rod section 20 dragging line 24 from reel 16. Proper aiming of the tip of fishing apparatus 10 will cause the lure to be propelled quite accurately to a selected target area.

FIGS. 2, 3 and 4 show the details of those elements which convert a conventional fishing rod and spinning reel assembly to the configuration of the target fishing apparatus 10 shown in FIG. 1.

FIG. 2 shows a partially cutaway view of triggering mechanism 28. The case 31 in the unit reduced to practice was made of an impact resistant plastic, for example, polystyrene, which was not effected by salt water. The front of the triggering mechanism terminated in a cylindrical barrel 33 which was sized to accept the butt of the hand grip section 11 of the fishing rod.

A trigger 37 was arranged to pivot on pin 39. Pulling of trigger 37 causes it to compress spring 43 and to retract catch 40 into the barrel and out of slot 41 in the top of case 30. In the position shown in FIG. 2, catch 40 holds bait cup assembly locked in place in the triggering mechanism. When trigger 37 is pulled, catch 40 retracts and the bait cup assembly is pulled free by the elastic member.

The trigger assembly in the unit reduced to practice contained a safety catch 42. Safety catch 42 was a short pin of generally oval cross section set crosswise in case 30. The pin was about one fourth of an inch longer than the width of case 30 and arranged so that it could be pushed inward from either side. In one position a notch 44 in the side of pin 42 would line up so that extension 46 on the back of trigger 37 would drop into notch 44. When pushed to the other state of its travel, pin 42 would present a blank face to extension 46 and the trigger could not be depressed.

FIG. 3 shows the propulsion mechanism in greater detail. U-shaped yoke 36 has an integral clamp 38 at its midpoint which serves to attach the yoke to the rod at a location near where the flexible part of the rod joins the hand grip. Elastic member 30 attaches at its ends 32 and 34 to the tips of the U-shaped yoke 36. In the unit reduced to practice elastic member 30 was a strip of rubber about 5/16 inch wide by 1/16 inch thick by 18 inches long. U-shaped yoke 36 was made from ¼ inch diameter wire stock.

At the center of elastic member 30 is the bait cup. This is more fully depicted in FIG. 4. Bait cup 26, in the unit reduced to practice, was about 1 inch in diameter and constructed of aluminum. Other materials will function equally well. The major criteria is that bait cup 26 be large enough to hold the baited hook or lure and that it be shatter resistant. Shaft 50 serves two functions. First, it pins bait cup 26 to the center of elastic member 30. This is accomplished by sandwiching bait cup 26 and elastic member 30 between washers 52 and 54 on a shoulder formed on one end of shaft 50. The sandwiched configuration can be held on one end of shaft 50 as by peening over the shaft end.

The second end of shaft 50 contains an aperture 56. The second end of shaft 50 fits into slot 41 (See FIG. 2) at the top of case 30 allowing catch 40 to penetrate aperture 56, holding it in place until trigger 37 is depressed.

To ready the target fishing apparatus for action, the fisherman grasps pistol grip 45 (See FIG. 2) in one hand and the periphery of bait cup 26 (See FIG. 3) in the other hand. He depresses trigger 37, after first releasing safety catch 42, and stretches member 30 sufficiently to engage the second end of shaft 50 in slot 41. With shaft 50 in the slot, trigger 37 is released, thereby engaging catch 40 in aperture 56 of shaft 50. With the propulsion device thus at the ready state, the fisherman releases the drag on reel 16 (See FIG. 1) and pays out enough line to allow the fishing lure to be brought back over the top between the arm of U-shaped yoke 36 and into the open end of the bait cup. The fisherman then readies his reel for casting, for example, by tripping the bail on a spinning reel. He then aims the tip of the rod in the direction of the desired target and pulls the trigger on triggering mechanism 28.

FIG. 5 shows a typical artificial lure that might be used with my target fishing apparatus. The lure includes a hook 60 that is imbedded in the body of an artificial bug 62. The line end of hook 60 is attached to one end of swivel 64. To the other end of swivel 64 is attached one end of a leader 66 having at its second end a loop 67. Loop 67 facilitates the attachment, as by tying, of line 24 from reel 16 (See FIG. 1). A lead weight 68 having a hole therethrough is threaded or clamped onto leader 66. The lead weight does two things. First, it provides mass to the lure thus assuring travel over a goodly distance when the lure is launched from the bait cup. Secondly, the use of weight 68 assures that the bait sinks downward into the water to a location where the fisherman expects to find fish.

After my invention has been used to propel the bait to the desired target area, the fisherman would proceed to operate reel 16 in the normal manner. FIG. 1 depicts use of a spinning reel which is normally operated by the left hand in the position shown.

When desirous of using a spin casting reel, the fisherman could better utilize the alternate triggering mechanism shown in FIG. 6. In this implementation, case 70 clamps over the butt end of hand grip 72 by means of set screw 74. This version of my invention uses a button type release operated by the thumb. Button 76 is supported on shaft 78. Midway down shaft 78 is attached as by brazing a cross-arm 80 which terminates at a catch 81. Cross-arm 80 serves to retain one end of compressive spring 82, the other end of spring 82 being supported on case 70. Pushing downward on button 76 allows the second end of shaft 50 to be inserted in slot 84. Once insertion is complete, release of button 76 causes catch 81 to engage aperture 56 in the outward extending end of shaft 50 associated with the bait cup assembly. With the exception of the triggering mechanism, all other parts of the target fishing apparatus are the same as described in conjunction with FIGS. 3 and 4.

What the FIG. 6 implementation does provide, however, is the capability to launch the bait carrying hook with line attached using a spin casting type reel hanging underneath the rod. Then, after the bait is deposited in the target area, the rod assembly can be axially rotated 180°, bringing the reel to the uppermost side of the rod where it can be cranked in the conventional manner.

Figure 7:
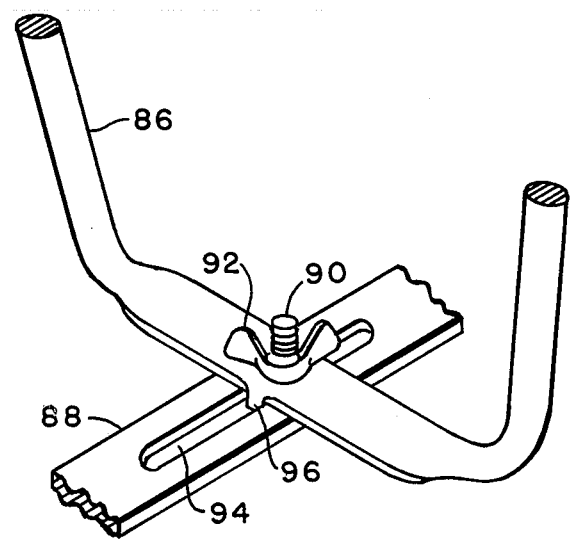
FIG. 7 is a perspective view of a U-shaped yoke mounted on a slotted section to allow adjustment of propelling force.

For those cases where my target fishing apparatus is assembled as a complete entity rather than an add-on package to an existing rod, the FIG. 7 implementation provides a useful addition. In FIG. 7, U-shaped yoke 86 is shown as being clamped to support 88 by means of stud 90 and wing nut 92. The release of wing nut 92 allows U-shaped yoke 86 to be slid fore and aft along slot 94. The yoke is kept perpendicular to support 88 by means of detent 96 which is merely a dimple formed in the middle flange of U-shaped yoke 86. It will be understood that support 88 forms an integral part of the rod assembly being located between the reel seat and the flexible tip portion of the rod.

By being able to slide the U-shaped yoke 86 up and down slot 94, more or less propulsive force can be incorporated in the launching of bait. With the yoke at the back of the slot, the bait is thrown only a short distance. As the yoke is moved farther down the slot, the elastic member must stretch more to get the shaft of the bait cup secured in the triggering mechanism. Release of the catch on the triggering mechanism thus causes the bait to be thrown farther as the yoke is moved farther out along the slot. Calibration marks along the edge of slot 94 can be of assistance to the fisherman in presetting the distance he wishes to propel the bait.

Other modifications and/or variations can be made without departing from the spirit of my invention. The foregoing description of two embodiments is to be considered as purely exemplary. For example the use of two tension springs and two foldable arms could also be used to launch the line carrying the baited hook from the bait cup. With my invention the fisherman does not have to swing the rod in a large arc launching the bait at the terminus of the arc. In close quarters, the entire rod assembly can be kept below shoulder level. Where accuracy in casting is required, as for example, when seeking bonefish, the user of my target fishing apparatus can consistently place the lure about two to three feet in front of where he anticipates a fish to be lurking.

I claim:

1. Fishing apparatus for casting a baited hook into a target area, comprising:
    a fishing rod consisting of, in combination, a hand grip having a butt end, the other end of the hand grip being joined to one end of a reel seat, said reel seat having provisions for affixing thereto a fishing line reel assembly, the second end of the reel seat continuing as a fore-grip section whose second end joins with a flexible rod section, the outermost end of said flexible rod section being terminated by a line guide;
    a reel secured to the reel seat of said fishing rod, said reel containing a supply of fishing line, one end of said fishing line being attached to said reel, the other end of said line passing through said line guide and terminating at a baited hook;
    a triggering mechanism having at its front end an open ended cylindrical barrel sized to accept the butt of the hand grip section of said fishing rod, said triggering mechanism including a longitudinal slot opening toward the front, said slot having a depressible catch mounted at a cross-axis position therein;
    an elastic member having its ends secured by structural support means to the fore-grip section of said fishing rod; and
    a bait cup having an open top and a closed bottom, the bottom of said bait cup being secured to the center of said elastic member by one end of a short shaft extending axially outward from the bottom of said bait cup, the second end of said shaft having a cross-axis aperture therethrough, said aperture being penetrable by the catch of said triggering mechanism when the shaft containing said aperture is inserted in the open end of said triggering mechanism slot on the stretching of said elastic member, whereby subsequent depressing of the catch on said triggering mechanism releases the bait cup allowing the elastic member to propel the baited hook with line attached from its repository in the bait cup toward a selected target.

2. The invention as defined in claim 1 wherein the structural support means for securing the ends of the elastic member to the fore-grip section of the fishing rod comprises a U-shaped yoke having at its midpoint, means for attaching said yoke to said fishing rod such that the plane containing both arms of the U-shaped yoke is perpendicular to the central axis of the fishing rod.

3. The invention as defined in claim 2 wherein the means for attaching said U-shaped yoke to said fishing rod is a clamp integrally secured to the midpoint of said yoke.

4. The invention as defined in claim 2 wherein the means for attaching the U-shaped yoke to said fishing rod includes means for adjustably positioning said U-shaped yoke over a restricted range along the longitudinal axis of said fishing rod whereby the propelling force applied to said baited hook on release of said triggering mechanism can be selectively varied.

5. The invention as defined in claim 1 wherein the reel secured to the reel seat is a spinning reel.

6. The invention as defined in claim 1 wherein the reel secured to the reel seat is a spin casting reel.

7. The invention as defined in claim 1 wherein the triggering mechanism comprises:
    a case having an open front end wherein can be inserted and secured the butt end of the hand grip section of said fishing rod, said case terminating at its rear in a downward projecting pistol grip, said case including along its top edge said front opening longitudinal slot sized for insertion of the short shaft extending from the bottom of said bait cup; and
    means within said case for actuating the depressible catch within said longitudinal slot by the pulling of a trigger extending outward from the junction of said case and said pistol grip.

8. The invention as defined in claim 7 and including a safety catch for preventing accidental operation of the triggering mechanism.

9. The invention as defined in claim 1 wherein the triggering mechanism comprises:
    a case having an open front end wherein can be inserted and secured the hand grip section of said fishing rod, said case terminating at its rear by an upward projecting housing topped off by a button release, said case including along its top front edge said front opening longitudinal slot sized for insertion of the short shaft extending for the bottom of said bait cup; and
    means within said case for actuating the depressible catch within said longitudinal slot by pressing said button release at the top of said case.

* * * * *

UNITED STATES PATENT AND TRADEMARK OFFICE
CERTIFICATE OF CORRECTION

PATENT NO. : 4,127,956

DATED : 12-5-78

INVENTOR(S) : Douglas J. Hertkorn

It is certified that error appears in the above–identified patent and that said Letters Patent are hereby corrected as shown below:

Col. 3, line 50, after "stretches" add -- elastic -- .

Col. 6, line 49, "for" should read -- from -- .

Signed and Sealed this

Thirteenth Day of March 1979

[SEAL]

Attest:

RUTH C. MASON
*Attesting Officer*

DONALD W. BANNER
*Commissioner of Patents and Trademarks*